United States Patent [19]

Noda et al.

[11] Patent Number: 4,844,995

[45] Date of Patent: Jul. 4, 1989

[54] POLYMER SOLID ELECTROLYTE AND A POLYMER SOLID ELECTROLYTE BATTERY

[75] Inventors: Tomohiko Noda; Youetsu Yoshihisa, both of Takatsuki, Japan

[73] Assignee: Yuasa Battery Company Ltd., Osaka, Japan

[21] Appl. No.: 197,968

[22] Filed: May 24, 1988

[30] Foreign Application Priority Data

Jun. 30, 1987 [JP] Japan .................................. 62-165008
Feb. 1, 1988 [JP] Japan .................................. 63-21606
Mar. 7, 1988 [JP] Japan .................................. 63-52933

[51] Int. Cl.$^4$ .......................... H07M 6/04; H07M 6/16
[52] U.S. Cl. ..................................... 429/189; 429/192; 252/62.2
[58] Field of Search ................ 429/189, 192; 252/62.2

[56] References Cited

U.S. PATENT DOCUMENTS

| | | | |
|---|---|---|---|
| 3,551,711 | 12/1970 | Grulke | 429/192 |
| 4,118,354 | 10/1978 | Harada et al. | 524/711 |
| 4,534,355 | 8/1985 | Potter | 204/403 X |
| 4,556,614 | 12/1985 | LeMehaute et al. | 429/192 X |
| 4,737,422 | 4/1988 | Knight et al. | 429/192 |

*Primary Examiner*—Stephen J. Kalafut
*Attorney, Agent, or Firm*—Watson, Cole, Grindle & Watson

[57] ABSTRACT

A polymer solid electrolyte comprises a crosslinked polyester in which a salt is dissolved, and which has a crosslinked structure of the formula:

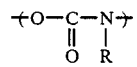

where R stands for an inert group other than a hydrogen atom. It is suitable as an electrolyte and a separator for a battery, especially a lithium battery which can be recharged. Batteries including such electrolyte are also disclosed.

11 Claims, 2 Drawing Sheets

POLYMER SOLID ELECTROLYTE AND A POLYMER SOLID ELECTROLYTE BATTERY

BACKGROUND OF THE INVENTION

1. Field of the Invention:

This invention relates to a polymer solid electrolyte and to a battery which utilizes a polymer solid electrolyte.

2. Description of the Prior Art:

A great deal of research work has been conducted into the possibility of using polymer solid electrolytes in batteries, displays, etc. Referring by way of example to the use of a polymer solid electrolyte in a lithium battery, it is interposed between a positive electrode and a negative electrode. There have been proposed a variety of series of materials for polymer solid electrolytes, including a series of polyethylene oxides, a series of polyphosphazenes and a series of polyamino acids.

A solid electrolyte battery has a number of advantages. For example, it is leakage-free, it has a high energy density, it is inexpensive, and it is easy to form in a layer-built structure. The material which has so far been tested more extensively than any other material is the series of linear polyethers. The materials of this series, however, have a melting point of about 60° C. and are used only at a temperature above their melting point, since at a temperature below their melting point, the molten salt undergoes crystallization and fails to exhibit a satisfactorily high ionic conductivity.

A series of crosslinked polyethers have been proposed to improve the linear polyethers. These materials have no melting point. Even at or around ordinary room tempeature, therefore, the molten salt hardly undergoes any crystallization, but shows a relatively good ionic conductivity. Trifunctional polyethers which are crosslinked with diisocyanates, such as tolylene 2,4-diisocyanate and hexamethylene diisocyanate, are, among others, suitable for use on an industrial basis. They are easy to produce and a thin film thereof is easy to form. They are expected to be particularly useful as an electrolyte for a rechargeable battery having a lithium anode.

A number of problems, however, arises from the use of any such crosslinked material in a common type of battery in which an intercalation-type metal compound is used as a cathode, and lithium as an anode. The first problem resides in a reduction of performance which occurs to the battery during its storage. The active hydrogen in the polymer solid electrolyte reacts with lithium during storage of the battery and thereby raises its internal resistance, resulting in a lowering of its capacity. The active hydrogen means hydrogen in an -OH group or in an —NH group, which reacts directly with an alkali or alkaline earth metal, or their ions. If a polyether crosslinked with isocyanate is used as the electrolyte, it means hydrogen in the urethane bond (-NHCOO-)

The second problem resides in the poor charging and discharging repeatability of the battery. This is apparently due to the fact that the polymer solid electrolyte is a bi-ionic conductor. If a common type of battery as hereinabove mentioned is discharged, anions (lithium ions) move from the anode to the cathode and lithium is intercalated in the cathode. The anions in the polymer electrolyte (e.g., perchloric acid ions in a battery containing molten lithium perchlorate) move toward the anode. However, the anode does not accept the anions, but the anions cause polarization in the electrolyte layer in the vicinity of the anode. If the battery is, then, charged, the cations which have been intercalated in the cathode can reversibly move to the anode through the electrolyte, but the anions which have polarized in the vicinity of the anode can return to their place of origin only very slowly. As a result, the ions in the polymer have a low degree of reversibility leading to a great reduction in battery capacity with repeated charging and discharging. Attempts have, therefore, been made to synthesize a single-ionic mobile polymer solid electrolyte in which only the cations are mobile, while the anions are fixed to the polymer chain. They have, however, been unsuccessful because of a great reduction of ionic conductivity, or for other reasons.

SUMMARY OF THE INVENTION

It is an object of this invention to provide a polymer solid electrolyte which can be stored for a long time withou lowering its quality, and a battery which includes a polymer solid electrolyte and can maintain its proper performance for a long time.

It is another object of this invention to provide a polymer solid electrolyte battery which permits repeated charging and discharging without suffering from any substantial reduction of capacity.

BRIEF DESCRIPTION OF THE DRAWINGS

In FIG. 1, 1 is a 0.1 mm thick layer of lithium, 2 is a teflon ring, 3 is a battery test sheet having a lower polymer portion and an upper portion formed from an active substance defining an anode, 4 is a titanium current collector, 5 is a teflon washer for thickness adjustment, 6 is a hermetic seal, 7 is an anode current collector, 8 is a cell, and 9 is a cell cover.

DETAILED DESCRIPTION OF THE INVENTION

Figure 1:
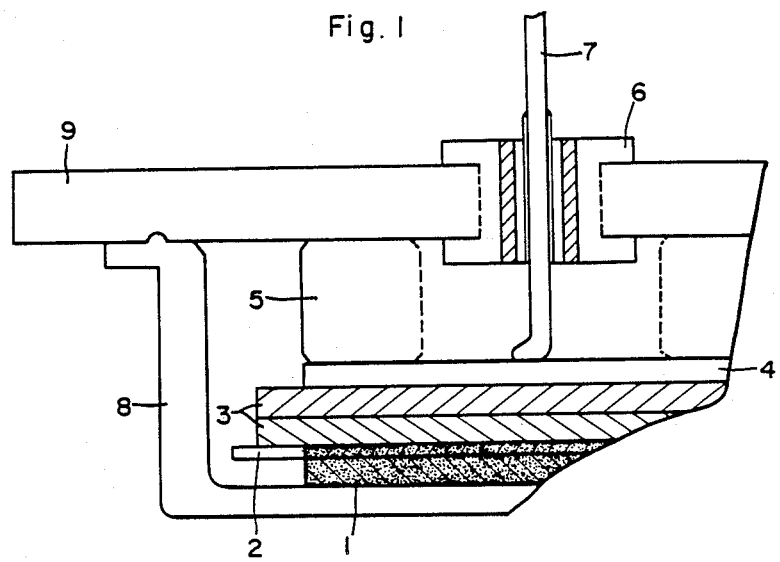
FIG. 1 is a partly cutaway view of a test cell used for testing a polymer solid electrolyte embodying this invention.

According to this invention, there is provided a polymer solid electrolyte formed from a crosslinked polyether having a crosslinked structure of the formula

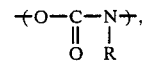

where R stands for an inert group which is inert group not a hydrogen atom.

There is also provided a polymer solid electrolyte which comprises a crosslinked polyether which is crosslinked with a urethane bond, and contains a substance which can replace an active hydrogen atom in the urethane bond with another inert group.

There is also provided a polymer solid electrolyte which comprises a crosslinked polyether having a crosslinked structure of the formula

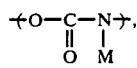

where M stands for an element of Group I of the periodic table other than a hydrogen atom.

There is also provided a polymer solid electrolyte comprising a crosslinked polyether in which a salt is dissolved, and which contains at least one group selected from among —$SO_3M'$, —$COOM'$, —$PO(OM')_2$ and —$PH(O)(OM')$, where M' stands for an element of Group I of the periodic table.

There is also provided a polymer solid electrolyte comprising a crosslinked polyether in which an inorganic salt is dissolved, and further containing 0.5 to 10 mols, per mol of the inorganic salt, of a substance having a large molecular shape and containing at least one group selected from among —$SO_3M'$, -$COOM'$, —$PO(OM')_2$ and —$PH(O)(OM')$.

According to this invention, there is also provided a polymer solid electrolyte battery which contains any of the polymer solid electrolytes as hereinabove described.

There is also provided a polymer solid electrolyte battery which contains only in the vicinity of an anode a polymer solid electrolyte comprising acrosslinked polyether having a crosslinked structure of the formula

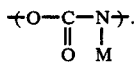

Although the active hydrogen in the polymer solid electrolyte lowers the performance of the battery during its storage, it is possible to obtain a polymer solid electrolyte having a long storage life if the active hydrogen is inactivated. Various methods are available for inactivating the active hydrogen. Alkylation and acylation are typical of those methods. An alkylating or cylating agent (—$C_NH_{2N+1}$ or —$COC_NH_{2N+1} 1N \geqq$) can be added to a polymer solid electrolyte to prevent its displacement reaction with metallic lithium, etc. The inactivating treatment can alternatively be introduced into the latter part of a process for producing a polymer solid electrolyte to replace any active element with an inert group before a product is fabricated.

Referring by way of example to a polyamine solid electrolyte, it has a structure of the formula:

The hydrogen of the —NH—group is liable to undergo a displacement reaction with lithium, etc. This displacement reaction can be prevented if an alkyl halide, such as methyl iodide, is added to the electrolyte. The alkyl portion of the alkyl halide replaces the hydrogen as soon as the metal ion is going to attack it, as shown by the following formula:

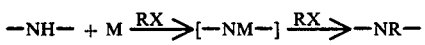

where M stands for a metal, R stands for an alkyl group, and X stands for a halogen.

The displacement reaction can also be prevented in accordance with a similar mechanism if an acylating agent, such as acetic anhydride, is added to the electrolyte, as shown by the following formula:

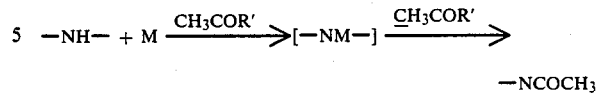

It is also possible to obtain a polymer solid electrolyte which is inert to lithium, etc., if the electrolyte is treated with an alkyl metal, such as butyl lithium, and is, then, alkylated with an alkyl halide, such as methyl iodide, as shown below:

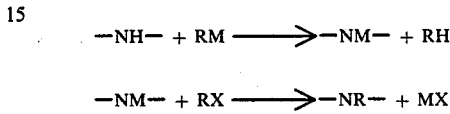

It is also possible to inactivate a polymer solid electrolyte if it is treated with an acetylatinga gent, such as acetyl chloride, as shown below:

—NH—+$CH_3COX$——$NCOCH_3$—+HX

If the electrolyte is only treated with an alkyl metal, such as butyl or phenyl lithium, it is rendered inert to lithium, etc.,. as active hydrogen H is replaced by the metal M.

It is desirable to employ a polymer solid electrolyte having a large cation transfer number in order to obtain a battery having an improved adaptability for repeated charging and discharging. In order to raise the cation transfer number of an inorganic salt dissolved in a polymer solid electrolyte, of which salt the greater part is dissociated into anions and cations, it is necessary to restrain the movement of the anions.

If a group replacing a hydrogen atom in a polymer solid electrolyte containing a urethane bond is highly electron-donative, or is ionic as in the case of metal, resonance is liable to occur to the urethane bond. In other words, electrons are strongly attracted to the oxygen atoms and there arises a deficiency of electrons on the nitrogen atom, as shown below:

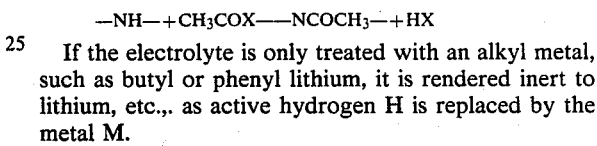

The anions separated from the inorganic salt combine with the nitrogen atom weakly and their movement is, therefore, restrained, while the transfer of the cations is enhanced.

If the group replacing the hydrogen atom is a metal, the transfer of cations can be enhanced still more effectively. As the cations of the metal which are rendered still more ionic by resonance can function as carrier ions, they increase the carrier ions in the polymer solid electrolyte and thereby raise the mobility of cations therein.

When the polymer solid electrolyte of this invention obtained by the substitution of a metal for hydrogen is used to make a battery, however, it is possible to use a known polymer (i.e., a polyether crosslinked with an isocyanate), too, as far as the interfacial area between the active material defining the anode and the electrolyte is concerned, without causing any reduction of battery capacity during its storage, or of its charging and discharging cycle life. It would rather be better to say that the polymer of this invention can be used more effectively for that portion of the electrolyte which excludes at least the interfacial area between the anode material and the electrolyte.

Therefore, it is desirable that the hydrogen atom of the urethane group in the polymer not be replaced by a lithium atom in the surface of at least one side of a sheet of electrolyte, so that the electrolyte of this invention obtained by the substitution of a metal may fully exhibit its advantages.

Various methods can be employed for making a sheet of polymer solid electrolyte according to this invention. According to one method, one surface of a sheet of polyether crosslinked with isocyanate is coated with a reactant solution, so that the substitution of lithium may occur on only one surface thereof. According to another method, the whole sheet is dipped in a reactant solution so that the substitution of lithium may occur on both surfaces of the sheet, and a hydrogen atom, or alkyl group is, then, substituted for the lithium on one of its surfaces. According to still another method, the substitution of lithium is caused on occur to both surfaces of a sheet and a polyether crosslinked with isocyanate is, then, formed on one of its surfaces. These methods are merely illustrative of a variety of methods which can be employed for making a sheet of this invention having one surface to which the substitution of lithium occurs, while no such substitution occurs to the other surface thereof.

The addition of a metal salt having giant anions, as well as the inorganic salt, to the polymer solid electrolyte is another method of restraining the movement of anions and thereby realizing a high cation transfer number. The electrostatic impact of the giant anions restrains the movement of anions of the inorganic salt. This method adapts the action of a cation exchange membrane.

The giant anions can be formed from the crosslinked polymer defining the polymer solid electrolyte itself, or can also be obtained by adding a metal salt with anions having a certain molecular weight. In the former case, the giant anions can be obtained by the chemical modification of a part of the crosslinked polymer, e.g., adding a —$SO_3Li$ group, while in the latter case, they can be obtained by adding a substance such as $C_nH_{2n+1}(CH_2CH_2O)_mSO_3Li$.

If the latter method is employed for making a polymer solid electrolyte, it is desirable that the substance as hereinabove mentioned be added to he polymer when it is crosslinked. The amount in which it is added has a certain range. It is necessary to add at least the amount in which the substance can begin to show the effect of restraining the movement of anions, but the addition of too large an amount prevents the crosslinking of the polymer. Although the amount may somewhat differ with the substance which is employed, it is generally in the range of 0.5 to 10 mols per mol of the inorganic salt when the latter salt is used in the amount which is optimum for the ionic conductivity of the polymer solid electrolyte.

The invention will now be described in further detail with reference to several examples thereof. In the following examples, the working atmosphere was composed of dry air having a relative humidity not exceeding —50%, and the polyethers were of the triol type containing an ethylene oxide structure and a propylene oxide structure in a structural ratio of 8:2 and having a molecular weight of abou 3000, unless otherwise noted. Prior to use, they were dried at a temperature of 100° C. in a vacuum, while being stirred by a magnetic stirrer in a three necked flask.

A solution of lithium pechlorate and polyether was prepared as will hereinafter be described. The polyether to be dissolved was addedto an acetone solution containing one part by weight of llithium perchlorate for 10 parts by weight of polyether, and the solution was heated at a tempeature of 100° C. in a vacuum, while being stirred by a magnetic stirrer in a three-necked flask, until no distillate formed.

A paste of an active material forming the cathode was prepared as will hereinafter be described. Eleven parts of a solution of lithium perchlorate and polyether, two parts of dimethylacetamide, an equivalent amount of hexamethylene diisocyanate and 0.006 part of di-n-butyltin diacetate were fully mixed to form a first mixture. Nine parts of a vanadium oxide powderand one aprt of acetylene black were fully mixed and their mixture was dried. The latter mixture was added to the first mixture and they were fully kneaded together to form a paste. The paste was used immediately after its preparation.

EXAMPLE 1

Five parts of a dry polyether, one part of dimethylacetamide, an equivalent amount of hexamethylene diisocyanate and 0.003 part of di-n-butyltin diacetate were fully mixed together. The mixture was coated on a 50 micron nonwoven fabric of polypropylene and its was left to stand at a temperature of 80° C. for 16 hours in an argon gas atmosphere to form a sheet.

The sheet was dipped in a 0.1 mol/1 n-hexanen solution of n-butyl lithium in an argon gas atmosphere and was left therein for three hours. Then, it was transferred into a 0.02 wt.% n-hexane solution of methyl iodide and after one hour of immersion, it was washed with n-hexane and the n-hexane was thereafter removed by volatilization.

Then, the sheet was dipped in a 0.04 mol/1 acetone solution of lithium perchlorate in a totally closed vessel and was left therein for 20 minutes, whereby lithium perchlorate was dissolved in the sheet. Then, the past of the active material forming the cathode, which has been prepared as hereinabove described, was coated on the upper surface of the sheet. The sheet was left to stand at a temperature of 80° C. for 16 hours in an argon gas atmosphere and was, then, dried at the same temperature for 48 hours in a vacuum. Then, the sheet was incorporated into a battery test cell, which will hereinafter be referred to as "Cell I".

EXAMPLE 2

Two part of dimethylacetamide, an equivalent amount of hexamethylene diisocyanate, 0.006 part of di-n-butyltin diacetate and two parts of methyl iodide were fully mixed in 11 parts of a solution of litlhium perchlorate and polyether. The mixture was coated on a 50 micron nonwoven fabrice of polypropylene and it was left to stand at a temperature of 80° C. for 16 hours in an argon gas atmosphere to form a sheet. The paste as hereinabove described was coated on the upper surface of the sheet. The sheet was left at a temperature of 80°

C. for 16 hours in an argon gas atmosphere and was dried. Then, it was incorporated into a battery test cell, which will hereinafter be referred to as "Cell II".

EXAMPLE 3

Five parts of a dry polyether, one part of dimethylacetamide, an equivalent amount of hexamethylene diisocyanate and 0.003 part of di-n-butyltin diacetate were fully mixed together. The mixture was coated on a 50 micron nonwoven fabric of polypropylene and it was left at a temperature of 80° C. for 16 hours in an argon gas atmosphere to form a sheet.

The sheet was dipped in a 0.1 mol/1 n-hexanen solution of n-butyl lithium in an argon gas atmosphere and was left therein for three hours. Then, it was washed with n-hexane and the n-hexane was removed by volatilization.

Then, the sheet was dipped in a 0.04 mol/1 acetone solution of lithium perchlorate in a totally closed vessel and was left therein for 20 minutes, whereby lithium perchlorate was dissolved in the sheet. The paste as hereinabove described was coated on the upper surface of the sheet. The sheet was left to stand at a temperature of 80° C. for 16 hours in an argon gas atmosphere and was dried at the same temperature for 48 hours in a vacuum. It was incorporated into a battery test cell, which will hereinafter be referred to as "Cell III".

EXAMPLE 4

Five parts of a dry polyether, one part of dimethylacetamide, an equivalent amount of hexamethylenen diisocyanate and 0.003 part of di-n-butyltin diacetate were fully mixed together. The mixture was coated on a 50 micron nonwoven fabric of polypropylene and it was left to stand at a temperature of 80° C. for 16 hours in an argon gas atmosphere to form a sheet. The sheet was dipped idn a 0.1 mol/1 n-hexane solution of n-butyl lithium in an argon gas atmosphere and was left therein for three hours. Then, it was washed with n-hexane and the n-hexane was removed by volatilization. The sheet was, then, dipped in a 0.04 mol/1 acetone solution of lithium perchlorate in a totally closed vessel and was left therein for 20 minutes, whereby lithium perchlorate was dissolved in the sheet.

Two parts of dimethylacetamide, an equivalent amont of hexamethylene diisocyanate and 0.006 part of di-n-butyltin diacetate were fully mixed in 11 parts of a solution of lithium perchlorate and polyether. The mixture was applied to the upper surface of the sheet to form a thin layer thereon and the sheet was left to stand at a temperature of 80° C. for 16 hours in an argon gas atmosphere.

The paste as hereinabove described was coated on the upper surface of the sheet. Then, the sheet was left to stand at a temperature of 80° C. for 16 hours in an argon gas atmosphere and was dried at the same temperature for 48 hours in a vacuum. It was incorporated into a battery test cell, which will hereinafter be referred to as "Cell IV".

EXAMPLE 5

A part of the hydroxyl groups in the same polyether as had been employed in the foregoing examples were esterified and neutralized with lithium chloride to form -SO$_3$Li groups. The terminal —OH and —SO$_3$Li groups in the polyether had a ratio of 9:1.

Lithium perchlorate was dissolved in the polyether by the method which had been employed in the foregoing examples. Two parts of dimethylacetamide, an equivalent amount of hexamethylenen diisocyanate and 0.006 part of di-n-butyltin diacetate were fully mixed in 11 parts of a solution of lithium perchlorate and polyether. The mixture was coated on a 50 micron nonwoven fabric of polypropylelne and it was left to stand at a temperature of 80° C. for 60 hours in an argon gas atmosphere to form a sheet. Then, the paste as hereinabove described was coated on the upper surface of the sheet. The sheet was left to stand at a temperature of 80° C. for 16 hours in an argon gas atmosphere and was dried at the same temperature for 48 hours in a vacuum. It was incorporated into a battery test cell, which will hereinafter be referred to as "Cell V".

EXAMPLE 6

An equivalent amount of hexamethylene ndiisocyanate, 0.006 part of di-n-butyltin diacetate, and a solution which had been prepared by dissolving 4 parts of a substance of the formula $C_{12}H_{25}(CH_2CH_2O)_4SO_3Li$ in four parts of dimethylacetamide were fully mixed in 11 parts of a solution of lithium perchlorate and polyether. The mixture was coated on a 50 micron nonwoven fabric of polypropylene and it was left to stand at a temperature of 80° C. for 16 hours in an argon gas atmosphere to form a sheet. The paste as hereinabove described was coated on the upper surface of the sheet and the sheet was left to stand at a tempeature of 80° C. for 16 hours in an argon gas atmosphere. Then, the sheet was dried at the same temperature for 48 hours in a vacuum and was incorporated into a battery test cell, which will hereinafter be referred to as "Cell VI".

A comparative cell was prepared in accordance with the prior art. Two parts of dimethylacetamide, an equivalent amount of hexamethylene diisocyanate and 0.006 part of di-n-butyltin diacetate were fully mixed in 11 parts of a solution of lithium pechlorate and polyether. The mixture was coated on a 50 micron nonwoven fabric of polypropylene and was left to stand at a temperature of 80° C. for 16 hours in an argon gas atmosphere to form a sheet. The paste as hereinbefore described was coated on the upper surface of the sheet and the sheet was left to stand at a tempeature of 80° C. for 16 hours in an argon gas atmosphere. Then, it was dried at the same temperature for 48 hours in a vacuum and was incorporated into a battery test cell, which will hereinafter be referred to as "Cell VII".

Thirty cells of each of the seven types I to VII were prepared and were tested for their variation of capacity during storage and their charging and discharging cycle life.

Twenty cells of each type were tested for variation of capacity during storage. They were placed in a thermostatic oven of the recirculation type having a temperature of 80° C. Five cells were taken out of the oven and tested upon lapse of each of 0, 7.5, 15, and 30 days. The test was conducted by a constant current discharge of 13 μA (10 μA/cm$^2$) at a temperature of 80° C. until a final discharging voltage of 2 V was reached. The results are shown in FIG. 2.

Ten cells of each type were tested for their cycle life. They were placed in a thermostatic oven of the recirculation type having a temperature of 80° C. and were caused to discharge a current of 52 μA (40 μA/cm$^2$), while they were charged with a current of 26 μA (20 μA/cm$^2$), until a final discharging voltage of 2.0 V and a final charging voltage of 4.0 V were reached. The results are shown in FIG. 3.

Figure 2:
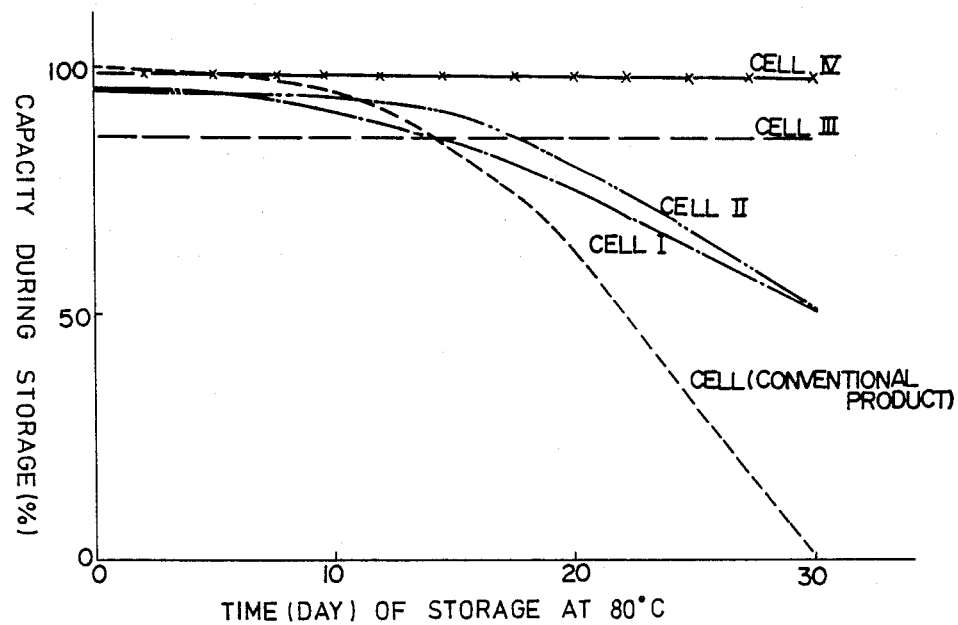
FIG. 2 is a graph comparing batteries embodying this invention and those known in the art with respect to their capacity during storage.
Figure 3:
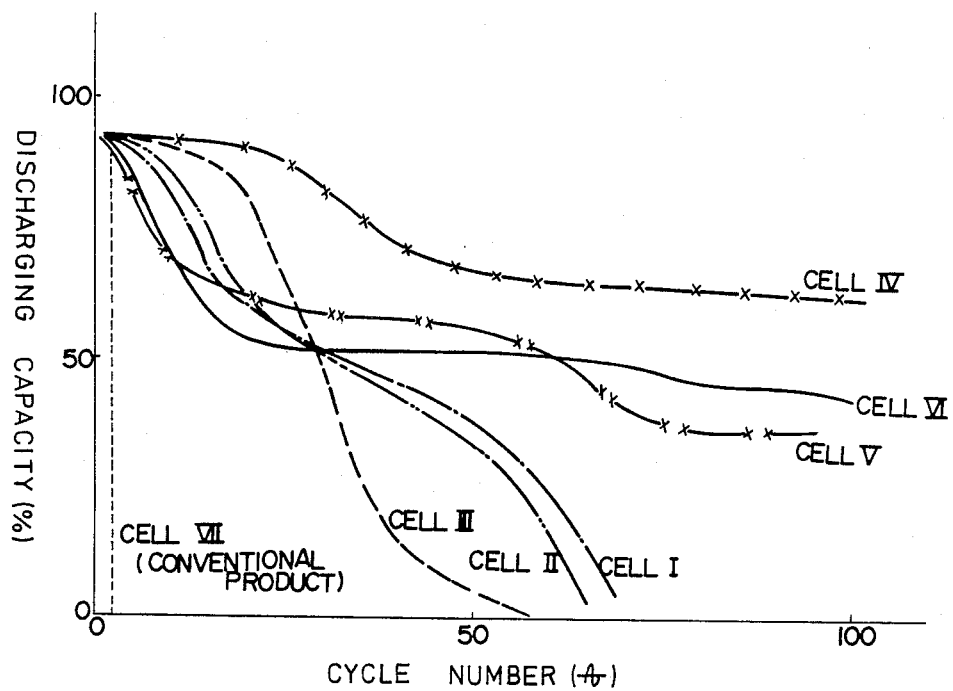
FIG. 3 is a graph comparing the results of charging and discharging cycle life tests conducted on the batteries embodying thi invention and those known in the art.

The results showon in FIGS. 2 and 3 confirm that the batteries of this invention are superior to the conventional one.

As is obvious from the foregoing description, this invention provides a polymer solid electrolyte which can be stored for a long time without suffering from any reduction of quality, and a battery whose performance is not lowered over long time periods. It also provides a polymer solid electrolyte battery which can be repeatedly charged and discharged without having any substantial reduction of capacity.

What is claimed is:

1. In a polymer solid electrolyte comprising a crosslinked polyether, the improvement wherein said crosslinked polyether has a structure of the formula:

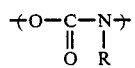

where R stands for $-C_nH_{2n+1}$ or $-COC_nH_{2n+1}$, $n \geq 1$.

2. A polymer solid electrolyte battery comprising a positive electrode, a negative electrode, and a polymer solid electrolyte comprising a crosslinked polyether having a crosslinked structure of the formula:

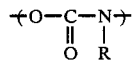

where R stands for $-C_nH_{2n+1}$ or $-COC_nH_{2n+1}$, $n \geq 1$.

3. In a polymer solid electrolyte comprising a polyether crosslinked with a urethane bond, the improvement wherein said electrolyte contains a substance which can replace an active hydrogena tom in said urethane bond with $-C_nH_{2n+1}$ or $-COC_nH_{2n+1}$, $n \geq 1$.

4. A polymer solid electrolyte battery comprising a positive electrode, a negative electrode, and a polymer solid electrolyte comprising a polyether crosslinked with a urethane bond, said electrolyte containing a substance which can replace an active hydrogen atom in said urethane bond with $-C_nH_{2n+1}$ or $-COC_nH_{2n+1}$'n $\geq 1$.

5. In a water-free, polymer solid electrolyte comprising a crosslinked polyether, the improvement wherein said crosslinked polyether has a crosslinked structure of the formula:

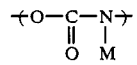

where M stands for an element of Group I of the periodic table other than a hydrogen atom.

6. A polymer solid electrolyte battery comprising a positive electrode, a negative electrodoe, and a polymer solid electrolyte comprising a crosslinked polyether having a crosslinked structure of the formula:

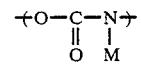

where M stands for an element of Group I of the periodic table other than a hydrogen atom.

7. In a water-free polymer solid electrolyte according to claim 5, wherein said electrolyte includes a salt dissolved therein, and wherein said crosslinked polyether is linked directly with at least one group selected from among $-SO_3M'$, $-COOM'$, $-PO(OM')_2$ and $-PH(O)(OM')$, where M' stands for an element of Group I of the periodic table.

8. A polymer solid electrolyte battery according to claim 6, wherein said solid electrolyte includes a salt dissolved therein, and wherein said crosslinked polyether is linked directly with at least one group selected from among $-SO_3M'$, $-COOM'$, $-PO(OM')_2$ and $-PH(O)(OM')$, where M' stands for an element of Group I of the periodic table.

9. In a battery including a polymer solid electrolyte comprising a crosslinked polyether having a crosslinked structure of the formula:

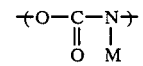

where M stands for an element of Group I of the periodic table other than a hydrogen atom, the improvement wherein said electrolyte is employed only in the vicinity of a negative electrode.

10. A polymer solid electrolyte comprising a crosslinked polyether, an inorganic salt dissolved in said crosslinked polyether, and 0.5 to 10 mols, per mol of said inorganic salt, of an unreacted substance containing at least one group selected from among $-SO_3M'$, $-COOM'$, $-PO(OM')_2$ and $-PH(O)(OM')$, where M' stands for an element of Group I of the periodic table.

11. A polymer solid electrolyte battery comprising a positive electrode, a negative electrode, and a polymer solid electrolyte, said polymer solid electrolyte comprising a crosslinked polyether, an inorganic salt dissolved in said crosslinked polyether, ad 0.5 to 10 mols, per mole of said inorganic salt, of an unreacted substance containing at least one group selected from among $-SO_3M'$, $-COOM'$, $-PO(OM')_2$ and $-PH(O)(OM')$, where M' stands for an element of Group I of the periodic table.

* * * * *